United States Patent [19]
Pozzetti

[11] 3,983,376
[45] Sept. 28, 1976

[54] CONTROL DEVICE FOR A MACHINE TOOL

[75] Inventor: Mario Pozzetti, Bologna, Italy

[73] Assignee: Finike Italiana Marposs-Soc. In Accomandita Semplice di Mario Possati & C., Bentivoglio, Italy

[22] Filed: Nov. 15, 1974

[21] Appl. No.: 524,212

Related U.S. Application Data

[63] Continuation of Ser. No. 455,494, March 27, 1974, which is a continuation of Ser. No. 273,710, July 21, 1972, abandoned.

[30] Foreign Application Priority Data

July 30, 1971  Italy .................................... 3487/71

[52] U.S. Cl............................ 235/151.13; 235/151; 51/2 AA; 51/165.88
[51] Int. Cl.² ......................................... B24B 49/04
[58] Field of Search............... 235/151.13; 51/165.88

[56] References Cited
UNITED STATES PATENTS 2,897,638  8/1959  Maker........................ 235/151.13 X
3,222,504  12/1965  Arnold et al................... 235/151.13

OTHER PUBLICATIONS

"Role of Statistical Computation in Machine-Tool Feedback Gaging" by David N. Smith from Control Engineering, Sept. 1957.

*Primary Examiner*—Eugene G. Botz
*Attorney, Agent, or Firm*—Stevens, Davis, Miller & Mosher

[57] ABSTRACT

An apparatus for controlling a machine tool which includes a measuring head for measuring a dimension (i.e. a diameter) of a workpiece, a detector for detecting and holding the maximum dimension measured by the measuring head, a circuit for determining the mean dimension of a plurality of measurements, a circuit for determining the dispersion between the measured dimensions and the mean, and a counter for inhibiting the control operation until a predetermined minimum number of workpieces have been measured.

6 Claims, 2 Drawing Figures

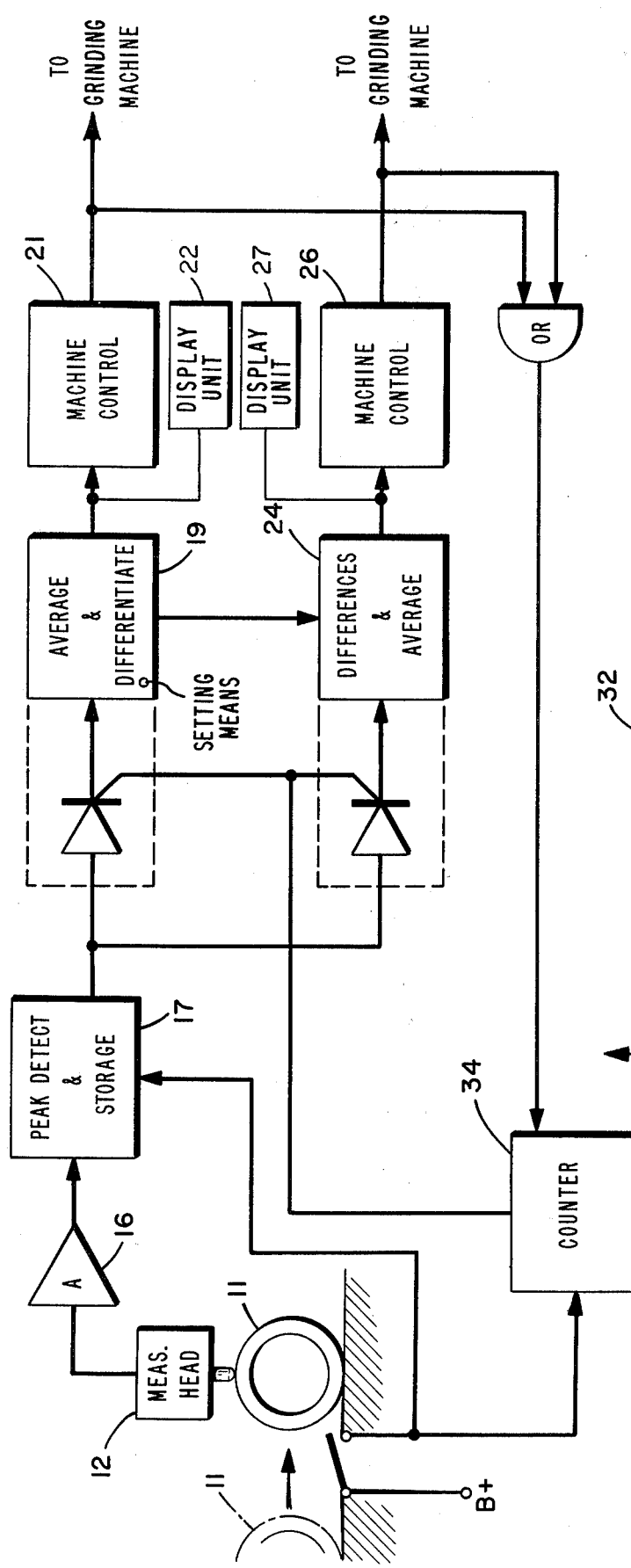

CONTROL DEVICE FOR A MACHINE TOOL

This is a continuation of Ser. No. 455,494, filed Mar. 27, 1974, which in turn was a continuation of Ser. No. 273,710, filed July 21, 1972, now abandoned.

The present invention relates to a control device for a machine tool for optimising the machine production cycle.

Considering in particular those machine tools which remove shavings or chips, the main problem is to obtain workpieces of the required dimensions. In many cases it is possible to carry out checking during machining in such a manner as to stop the machine when the piece has reached the required size. In other cases, because of the characteristics of the machines or the type of machining, it is impossible to check the workpieces during machining. Checking is then done after machining.

The tool correction is normally made on the basis of the results of the last measurement. This gives rise to difficulties because a single irregular workpiece can cause the machine to be wrongly set and result in the production of a number of workpieces which have to be rejected.

A first improvement has been obtained by introducing a counting device and making the correction of the tool take place after a certain number of pieces have been rejected for the same reason. Even with this method there are disadvantages, because a quantitative indication of the extent of the error is lacking.

The technical problem which the present invention proposes to resolve is the provision of a control device for a machine tool which optimises machine production and which is stable and prompt.

According to this invention there is provided a control device comprising means for the dimensional checking of each single workpiece, means for processing the data resulting from said dimensional checking and means for controlling the machine tool on the basis of the results of said processing.

The following description illustrates a preferred embodiment of the invention given by way of a non-limiting example with reference to the accompanying drawing, in which:

FIG. 1 is a block diagram of the device according to the invention; and

FIG. 2 is a diagram of the operation of the device of FIG. 1.

The rings 11 at the exit of the grinding machine are checked by a measuring head 12, fixed to a frame 13, in any known manner. The output signal from the head 12, suitably amplified by an amplifier 16, is fed to a unit 17 for detecting and memorizing the maximum value coinciding with the diameter of the rings 11. The unit is controlled in such a manner as to be able to receive the successive values, i.e. the measurements of the diameters of the rings 11 which pass in succession at the measuring head 12.

The measurements taken are fed to a processing unit 19 which, for example, effects an arithmetic mean on a predetermined number of workpiece measurements and which is continually updated at each new measurement made, or alternately a mean with exponential damping.

The unit 19 is also able to measure the speed of variation of the mean value.

The output from the unit 19 is applied to a control unit 21 for the machine tool and to a display unit 22 for the output.

The values of the measurements of the individual rings 11 at the output of the unit 17 are fed to a unit 24 able to calculate the dispersion of the instantaneous measured values with respect to the actual mean value. This dispersion is calculated, for example, by taking the absolute value of the difference between each value measured and the mean value present in the unit 19 and then effecting a mean, which may be arithmetic or with exponential damping, of these absolute values.

As the rings 11 present themselves in front of the measuring head 12 in a random arrangement, the value of the dispersion may be considered as an indication of the errors in the shape of the rings. The output signal from the unit 24 is fed to a control unit 26 for the machine and a display unit 27. As the shape errors depend mainly on the machine cycle and the conditions of the tool, this measurement may be employed for controlling the machine cycle and the changing of the tool.

FIG. 2 shows the normal progress of the dimensions of successively machined workpieces, by means of a curve 28. Because of wear of the tool, these dimensions increase according to a substantially linear law. During standard working, the progress of the mean value is under these conditions the same as that of the dimensions of the workpieces. The mean value is however less than the value of the workpiece being machined at the same moment, both because of the significance of the mean value, which takes into account a certain number of previous measurements, and because of the presence of a certain number of workpieces between the machining or working station and measuring station. In FIG. 2 the progress of the mean value is shown by a dashed line 29.

By knowing the mean value, its derivative at each instant and the number of pieces existing between the machining and measuring stations, it is possible to calculate the actual value of the dimensions of the piece being machined and hence correct the machine so that the dimensions of the pieces remain within the desired tolerance limits, indicated by the reference numerals 31 and 32 in FIG. 2.

Particular problems arise when the curve 28 presents discontinuities 33. This occurs particularly following corrections made to the tool of the machine after changing the tool or after dressing the grinding wheel in the case of grinding machines. In these cases the value of the dimensions of the workpieces 11 changes sharply and then commences to increase again according to the usual law. The problem which has to be resolved is to reduce this transitional period to a minimum.

The device according to the invention comprises a counter 34, connected with units 17, 19, 21, 24, 26, which starts to count the workpieces which pass upon receiving the information that the correction or tool change has been made. This signal also blocks the processing of the data in the units 19, 24, preventing the control of the machine until the counter 34 indicates that a certain number of workpieces has passed (previously determined according to the machining conditions and set on the counter) equal to the number existing between the machining and measuring stations. These pieces are no longer significant for the control. When these pieces have passed the data processing is unblocked and machine control recommences. In addition the configuration of the device contained in the unit 19 for calculating the mean value is varied by setting it in such a manner that the mean is taken of a smaller number of workpieces than the normal. The updating of the mean value is much quicker, thereby facilitating the checking of the accuracy of the correction made or the positioning of the new tool. By also taking into account the speed of variation of the mean value by means of the device which effects its derivative, it is possible to increase to a maximum the speed of updating, thereby minimizing the number of pieces which might be outside the permitted tolerance derived from an erroneous correction or erroneous positioning of the new tool.

The process of updating the mean value may be further accelerated by storing in the mean value memory with a value equal to that which the workpieces should theoretically have after the variation. The updating curve assumes in this case the form shown by the dashed and dotted line 35 in FIG. 2.

The embodiment described relates to a machine in which when working the variations in the workpiece take place in a single direction. It is however evident that the process may be easily extended to any case, by simply effecting the corrections in such a manner as to make the tool produce pieces which lie at the center of the band of tolerance and not close to one of the limits.

It is evident that a control system of the type here described eliminates the disadvantages of the prior art system. In fact, the machine correction is made on the basis of the information derived from a number of workpieces, which is adjustable at will and is hence substantially independent of the presence of any irregular piece. The process is hence extremely stable.

Finally, a control of the type here described enables corrections to be made with the necessary promptness by a suitable adjustment of the control advance which takes into account the speed of variation of the mean value of the measurements, the number of pieces existing between the machining and measuring stations, and any other possible factor.

What is claimed is:

1. An apparatus for controlling a machine tool comprising a measuring head for measuring a given dimension of the successive workpieces machined by the machine tool; detecting and storing means for detecting workpieces being measured and storing a signal representing the successive values of the dimensions of the workpieces measured by said measuring head; calculating means connected to said detecting and storing means for calculating a mean value of said successive values; control means connected to said calculating means for controlling the machine tool; and counting means connected with said detecting and storing means, said calculating means, and said control means for receiving information regarding the adjustments made to the machine, and for providing a count signal indicating that a predetermined number of workpieces has been counted after an adjustment, said calculating means having a presettable configuration for accelerating the updating of said mean value after said count signal has been generated.

2. The apparatus as claimed in claim 1, in which said calculating means is also adapted to measure the speed of variation of the mean value for controlling the machine thereby.

3. The apparatus as claimed in claim 1, in which said calculating means is adapted to store, as a mean value, after said adjustment to the machine, a value corresponding to the theoretical dimension the workpieces should have after the adjustment.

4. The apparatus according to claim 1, further comprising second calculating means connected with said detecting and storing means and the first calculating means for calculating the dispersion of the values of the dimensions of the workpieces with respect to their mean value, said second calculating means being connected to further control means for controlling the machine tool.

5. The apparatus as claimed in claim 4, in which said counting means is also connected with said second calculating means for blocking the processing of said first and second calculating means after receipt of said information regarding adjustments made to the machine.

6. The apparatus as claimed in claim 1, in which said calculating means further comprises means, operated by the counting means when the counting means receives said information regarding adjustments made to the machine, for blocking the processing of the calculating means and thereby preventing the actuation of said control means and, after the counting means has counted said predetermined number of workpieces, for unblocking the processing of the calculating means.

* * * * *